W. I. TUSTIN.
Wind-Mills.
No. 5,354.
Reissued April 15, 1873.
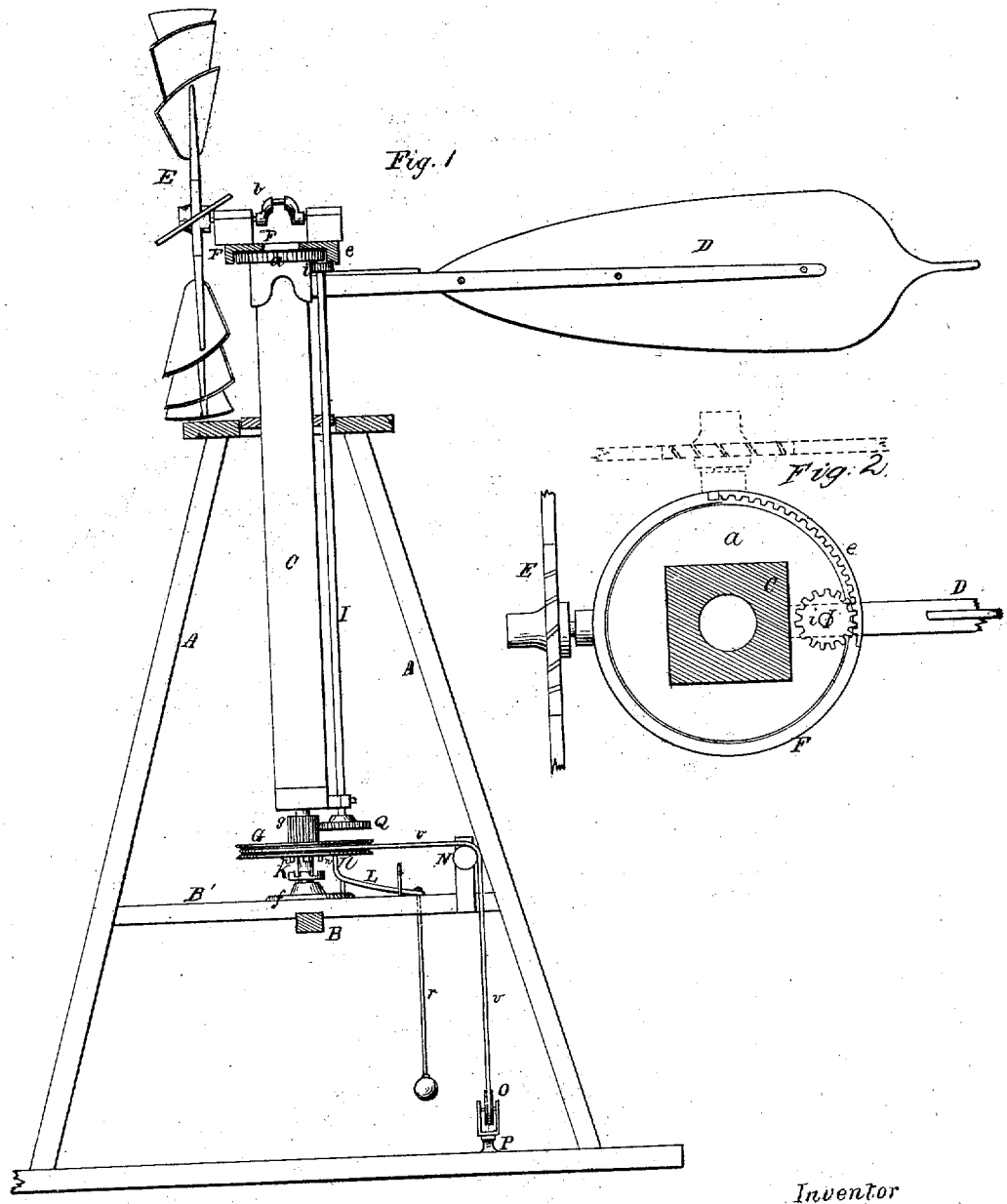
Witnesses
Jno L Burne
Wm Gerlach
Inventor
William I Tustin
THE NORRIS PETERS CO., PHOTO-LITHO., WASHINGTON, D.C.

UNITED STATES PATENT OFFICE.

WILLIAM I. TUSTIN, OF SAN FRANCISCO, CALIFORNIA.

IMPROVEMENT IN WINDMILLS.

Specification forming part of Letters Patent No. 97,136, dated November 23, 1869; reissue No. 5,354, dated April 15, 1873; application filed January 16, 1873.

*To all whom it may concern:*

Be it known that I, WILLIAM I. TUSTIN, of the city and county of San Francisco, State of California, have invented an Improved Windmill; and I do hereby declare the following description and accompanying drawing are sufficient to enable any person skilled in the art or science to which it most nearly appertains to make and use my said invention or improvement without further invention or experiment.

My invention relates to an improved construction of windmills, such as are employed for obtaining power from the impulse of the wind; and it consists in constructing the wheel which carries the vanes and the rudder in two parts, and uniting them together by a suitable turn-table so that the wheel can be turned about to stand at any required angle to the rudder so as to regulate the speed by causing the wind to strike the sails or vanes in the direction or at the angle requisite for producing the required speed. It also consists in the employment of a vertical rod for adjusting the wheel and rudder to the desired position with reference to each other. To the lower end of this rod I attach an arrangement by which a person standing upon the ground can easily shift the wheel or rudder to the desired position.

Referring to the accompanying drawing forming a part of this specification, A is the frame which supports the mill, and B B′ the cross-timbers, into which the lower end of the vertical hollow shaft C steps. The guide vane or rudder D is secured firmly to the top of the revolving shaft C by any suitable means so as to be stationary, and a circular flange, *a*, which forms the bed of the turn-table, projects at right angles from its top. The crank-shaft *b*, to which the wheel E is attached, turns in boxes on the circular table F. This circular table is provided with a segmental flange, *e*, which projects downward from the outside rim, the inside of which is toothed, forming a segmental rack. This circular table is placed, as before hinted, upon the circular flange *a* on the top of the shaft, thus forming a turn-table. On the lower end of the vertical shaft C is a spindle or hollow step-gudgeon, which steps into the metal plate *f*, in which the bearing of the shaft rests. On this spindle is placed loosely a pulley, G, having a small pinion, *g*, secured to its upper face around the spindle. A connecting-rod, I, extends parallel with the shaft C, having at its lower end a gear-wheel, Q, and on its upper end a pinion, *i*. The upper end of this rod passes through the rudder-bar, and the pinion *i* engages with a segmental rack, *e*, while the wheel on the lower end engages with the toothed pinion *g* on the pulley G, so that by turning the pulley the table F is turned around so as to stand at any required angle to the rudder. Directly under the pulley G is a clutch-ring, K, which is secured to the spindle so as to be stationary, and upon which the pulley G rests when not elevated by the lever L. Above the coupling, and on the under side of the pulley G, are projecting lugs or pins *u*, which, when the pulley drops by its own weight upon the coupling, engage with it and prevent the pulley from turning, thereby securing the wind-wheel in its required position relative to the line of the wind at all times, even should the wind veer the rudder to a different position. An endless cord, *v*, passes around the pulley G and over the small pulleys N on the cross-bar B′, and thence passing downward it passes around the pulley O, to which is attached a weight, P. A cord, *r*, is attached to one end of a curved lever, L, which is secured upon one of the cross-timbers B directly under the pulley G, so that by pulling downward upon the cord the opposite end of the curved lever is elevated, carrying with it the pulley G, and clearing it from the clutch-coupling so as to allow it to turn as may be required.

After the pulley has been freed from the coupling K, by drawing downward upon one side of the endless cord *v* the pulley is turned, causing the pinion *i* to operate the gear-wheel Q and rod I, and through the rod the circular table F, thus placing the wind-wheel at any desired angle to the wind; and by drawing downward upon the opposite side, it is drawn back into line with the rudder, when, by letting go of the cord *r*, the pulley G will fall by its own weight and engage with the coupling below, thus fixing the wheel at the desired angle to the rudder so that it will have the same relative position to the wind, no difference from which direction the wind comes or to which it changes.

Having thus described my invention, what I claim, and desire to secure by Letters Patent, is—

1. The table F with its projecting segmental rack *e*, turning on the flange *a*, in combination with the wheel E and rudder D, substantially as and for the purpose herein described.

2. The vertical connecting-rod I, wind-wheel E, and rudder D, in combination with the toothed wheel Q, pinion *g*, pulley G, endless cord, and weights P, substantially as and for the purpose above described.

3. The pulley G with its toothed pinion *g* and under-projecting lugs or pins *u*, the same being raised by means of the curved lever L, and operated by the endless cord *v* passing over pulleys N and O and kept taut by the weight P, substantially as described, for the purpose herein set forth.

4. In connection with a windmill having a slewing-rudder for the purpose of adjusting the wind-wheel to the wind, the rod I, applied substantially as described, for changing the relative position of the wind-wheel and rudder from the ground, as set forth.

In witness whereof I hereunto set my hand and seal.

WILLIAM I. TUSTIN. [L. S.]

Witnesses:
C. NASH,
A. H. EVANS.